United States Patent
Meinhardt et al.

(10) Patent No.: US 9,632,012 B2
(45) Date of Patent: Apr. 25, 2017

(54) VEHICLE DIFFERENTIAL HOUSING AND METHOD OF NVH TESTING

(71) Applicant: GM Global Technology Operations LLC, Detroit, MI (US)

(72) Inventors: Glenn Meinhardt, Utica, MI (US); Eric L. Hartzell, Fenton, MI (US); Brad A. Davis, Holly, MI (US); Anthony W. Jablonski, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 126 days.

(21) Appl. No.: 14/789,475

(22) Filed: Jul. 1, 2015

(65) Prior Publication Data

US 2017/0003197 A1    Jan. 5, 2017

(51) Int. Cl.
*G01M 15/00* (2006.01)
*G01M 17/007* (2006.01)
*F16H 48/08* (2006.01)
*F16H 57/037* (2012.01)

(52) U.S. Cl.
CPC .......... *G01M 17/007* (2013.01); *F16H 48/08* (2013.01); *F16H 57/037* (2013.01)

(58) Field of Classification Search
CPC .. G01M 13/02; G01M 13/025; G01M 17/007; G01M 99/0008; G01C 9/00; F16H 48/08
USPC ................. 73/115.06, 115.01, 115.05, 865.9
See application file for complete search history.

(56) References Cited

U.S. PATENT DOCUMENTS

| | | | | |
|---|---|---|---|---|
| 5,679,088 A | * | 10/1997 | Akashi | B62M 9/08 475/16 |
| 6,389,888 B1 | * | 5/2002 | Juranitch | G01M 13/02 73/115.06 |
| 2005/0022580 A1 | * | 2/2005 | Kurecka | G01M 13/028 73/11.04 |

* cited by examiner

*Primary Examiner* — Lisa Caputo
*Assistant Examiner* — Nigel Plumb
(74) *Attorney, Agent, or Firm* — Cantor Colburn LLP

(57) ABSTRACT

A drive module and a system for performing NVH testing on the drive module are provided. The system includes two pins extending from a platform and at least one qualified surface. A differential housing includes two surfaces, each having an opening formed therein. The differential housing further includes a clamping surface. The drive module is mounted to the platform by inserting the pins into the openings to align the drive module in a plane. A clamping pressure clamps the differential housing to the qualified surface to align the drive module in a second direction that is perpendicular to the plane such that the drive module pinion and axles are aligned with the energy sources of the system.

18 Claims, 5 Drawing Sheets

VEHICLE DIFFERENTIAL HOUSING AND METHOD OF NVH TESTING

FIELD OF THE INVENTION

The subject invention relates to a vehicle having a differential housing and axle assembly, and more particularly, to an assembly configured for mounting to a noise, vibration and harshness (NVH) test assembly.

BACKGROUND

Vehicles, such as automobiles and trucks for example, include a differential housing and axle assembly, sometime colloquially referred to as a drive module. The drive module is connected to the vehicle engine by a prop-shaft. The prop-shaft transmits rotational energy (torque) developed by the vehicle engine to the assembly, which in turn transmits the rotational energy to the wheels. In a rear-wheel drive vehicle, the prop-shaft directly couples the assembly to the vehicle's transmission. In an all-wheel or four-wheel drive vehicle, additional components may also be included, such as a power take-off unit for example.

It should be appreciated that the rotation of the gears within the drive module may generate or transmit vibrations. These vibrations may in some instances become a noise source that may be transmitted to the vehicle compartment. Testing equipment and methods have been developed to allow the measurement of NVH prior to installation in the vehicle. The NVH testing methods typically involve connecting an energy source (e.g. a motor) to the pinion shaft entering the differential housing and at each wheel. Alignment of the rotating shafts needs to be accomplished within desired specifications otherwise inconsistent test results may occur. It has been found that alignment of the shafts and clamping of the drive module to the test fixture are large contributors to NVH tester repeatability and throughput issues.

Accordingly, it is desirable to provide a drive module that facilitates NVH testing with a desired level of reliability.

SUMMARY OF THE INVENTION

In one exemplary embodiment of the invention, a system for performing a noise, vibration and harshness (NVH) testing on a vehicle differential housing and axle assembly is provided. The assembly includes a differential housing having a first surface with a first hole, a second surface with a second hole and a third surface. The assembly further having a pinion, a first axle and a second axle. The system comprises a platform and a first pin extending from a first qualified surface. The first pin sized and arranged on the platform to be received in the first hole. A second pin extends from a second qualified surface, the second pin sized and arranged on the platform to be received in the second hole. A third qualified surface is arranged on the platform to engage the third surface. A first energy source is operably coupled to the platform and aligned along a first axis, the first energy source being configured to align with the pinion along the first axis. A second energy source is coupled to the platform and aligned along a second axis, the second axis being perpendicular to the first axis, the second energy source being configured to align with the first axle along the second axis. A third energy source is coupled to the platform and aligned with the second axis, the third energy source being configured to align with the second axle along the second axis.

In another exemplary embodiment of the invention, a differential housing and axle assembly configured to mount on an NVH testing apparatus is provided. The NVH testing apparatus having a first pin, a second pin and at least one qualified surface. The assembly comprising a differential housing having a pinion bore and a pair of opposing axle bores. The differential housing having a first side and an opposing second side, the first side having a first surface with a first hole formed therein, a second surface with a second hole formed therein and a third surface. The second side includes a first clamping surface opposite the first surface. A second clamping surface is arranged opposite the second surface and a third clamping surface is arranged opposite the third surface, wherein the first hole is sized and positioned to receive the first pin and the second hole is sized and positioned to receive the second pin. A pinion is arranged in the pinion bore and configured to couple with the NVH testing apparatus. A first axle extends from one of the opposing axle bores. A second axle extends from the other of the opposing axle bores.

In yet another exemplary embodiment of the invention, a method of NVH testing of a differential housing and axle assembly is provided. The method comprising the steps of: providing a test apparatus having a platform, a first pin, second pin and at least one qualified surface, the test apparatus further having a first energy source, a second energy source and a third energy source, first energy source being aligned along a first axis, the second energy source and third energy source being aligned along a second axis; providing a differential housing and axle assembly, the assembly including a housing having a first surface with a first hole formed therein, a second surface with a second hole formed therein and a third surface, the assembly further including a pinion arranged in the housing, a first axle and a second axle; inserting the first pin into the first hole and the second pin into the second hole; aligning the first axle and second axle with the second axis; aligning the pinion with the first axis; clamping the third surface to the at least one qualified surface; and coupling the pinion to the first energy source, the first axle to the second energy source and the second axle to the third energy source.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
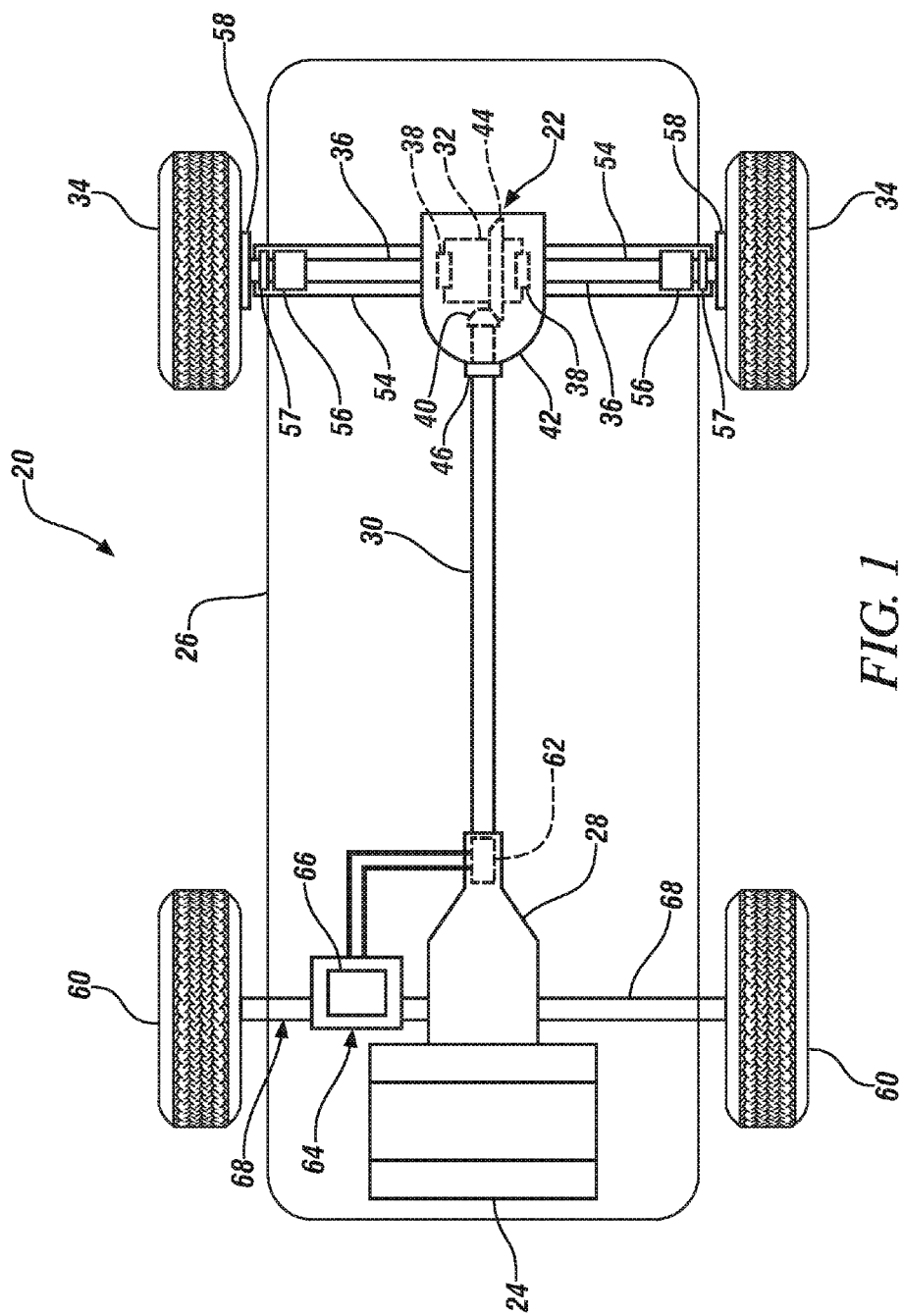
FIG. 1 is a bottom schematic view of a vehicle having a differential housing and axle assembly in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having a differential assembly and axle assembly, which are collectively referred to as drive module 22. It should be appreciated that the vehicle 20 may be an automobile, truck, van or sport utility vehicle for example. As used herein, the term vehicle is not limited to just an automobile, truck, van or sport utility vehicle, but may also include any self-propelled or towed conveyance suitable for transporting a burden. The vehicle 20 may include an engine 24, such as a gasoline or diesel fueled internal combustion engine. The engine 24 may further be a hybrid type engine that combines an internal combustion engine with an electric motor for example. The engine 24 and drive module 22 are coupled to a frame or other chassis structure 26. The engine 24 is coupled to the drive module 22 by a transmission 28 and a driveshaft 30. The transmission 28 may be configured to reduce the rotational velocity and increase the torque of the engine output. This modified output is then transmitted to the drive module 22 via the driveshaft 30. The drive module 22 transmits the output torque from the driveshaft 30 through a differential gear set 32 to a pair of driven-wheels 34 via axles 36.

The differential gear set 32 is arranged within a differential housing 42. The differential gear set 32 receives the output from the driveshaft 30 via a pinion gear 40 that transmits the torque to a ring gear 44. The pinion 40 includes a shaft that is coupled to the driveshaft 30 by a flange 46. The differential gear set 32 is supported for rotation within the housing 42 by a pair of differential bearings. The differential gear set 32 includes side gears 38 arranged within a housing 42 that are coupled to and support one end of the axles 36. The coupling of rotational components, such as the flange 46 to the pinion 40 or the side gears 38 to the axles 36 for example, may be accomplished using a spline connection.

In one embodiment, each axle 36 extends into an axle tube 54. The axle tube 54 includes a hollow interior that extends the length thereof. At one end of the axle tube 54 a bearing 56 is mounted to support the end of the axle 36 adjacent the driven-wheel 34. A shaft seal 57 is located between the bearing 56 and the wheel 34. A wheel mounting flange 58 is coupled to the end of the axle 36 adjacent the bearing 56. The flange 58 provides an interface for mounting of the driven-wheel 34.

The vehicle 24 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 34, 60. The transfer case 62 transmits a portion of the output to a front drive module 64, which may include additional components such as a differential gear set 66 and axles 68 that transmit the output to the wheels 60.

It should be appreciated that within the drive modules 22, 64, the transmission 28, the driveshaft 30 and the differential gear sets 32, 66 there are a number of rotational components that transfer rotational energy or torque to the wheels. It should further be appreciated that it is desirable to reduce or minimize any noise or vibration from these rotating members from transferring into the vehicle compartment.

Figure 2:
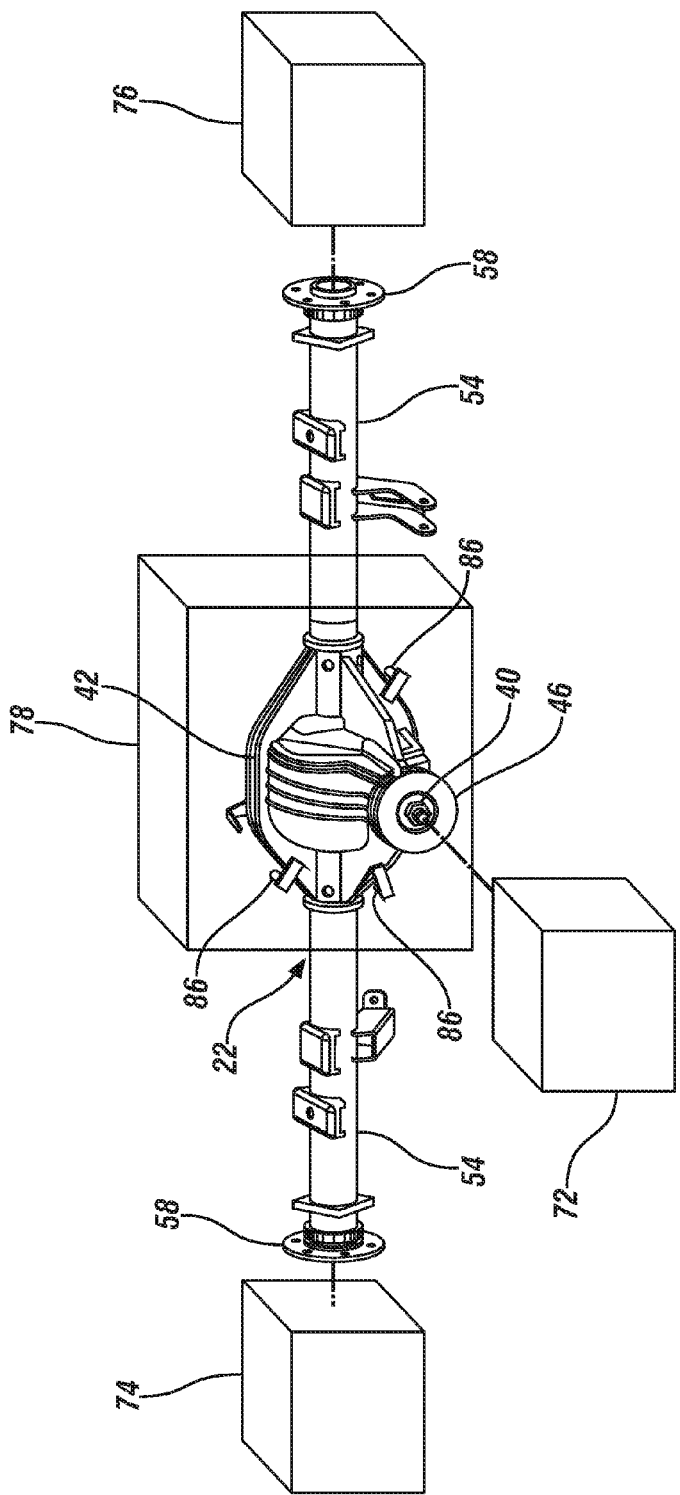
FIG. 2 is an isometric schematic view of an NVH test apparatus in accordance with an embodiment of the invention.
Figure 3:
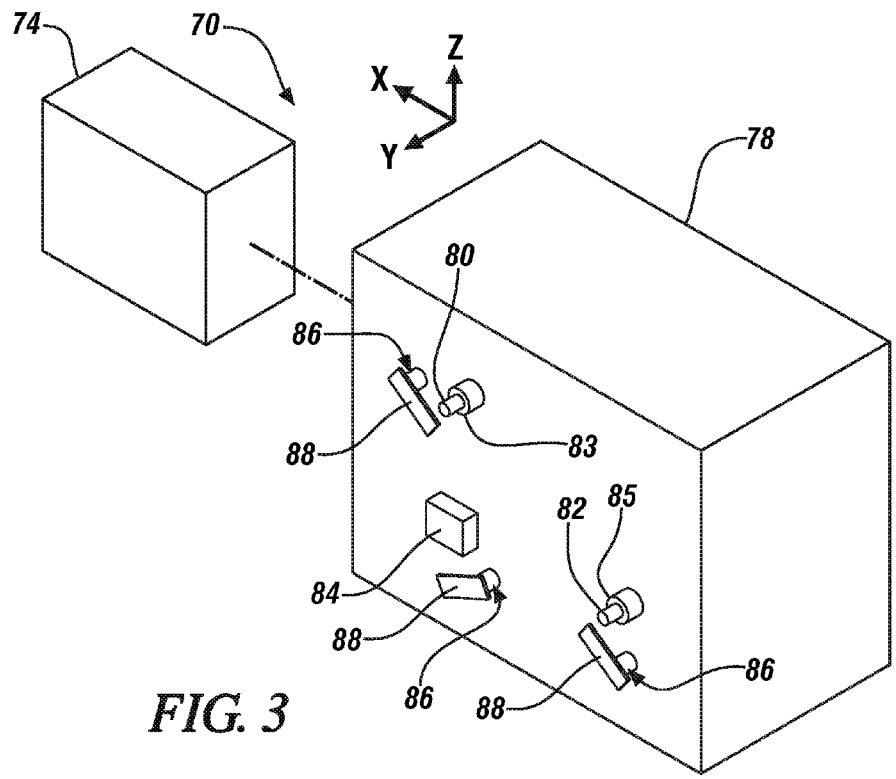
FIG. 3 is an isometric schematic view of a portion of the NVH test apparatus of FIG. 2 with the differential housing and axle assembly removed.

Referring now to FIG. 2 and FIG. 3, an exemplary NVH test apparatus 70 is shown for testing the drive module 22. It should be appreciated that while embodiments herein describe the NVH test apparatus 70 with respect to the rear drive module 22, this is for exemplary purposes and the claimed invention should not be so limited. In other embodiments, the test apparatus 70 may also be adapted to test the front differential housing and axle assembly 64. The NVH test apparatus 70 includes a first energy source, such as motor 72, that is adapted to couple with the flange 46. The NVH test apparatus 70 further includes a pair of opposing energy sources, such as motors 74, 76 that each couple with one of the wheel flanges 58. It should be appreciated that the motors 72, 74, 76 may be selectively energized to transmit torque to the pinion 40 or the axles 36 respectively. The NVH test apparatus 70 may further have sensors (not shown), such as accelerometers for example, as is known in the art, for measuring vibration at different points on the drive module 22.

The drive module 22 is mounted to the NVH test apparatus 70 via a platform 78. It should be appreciated that the platform 78 is fixed relative to the motors 72, 74, 76. The platform 78 is a substantially rigid structure that is configured to hold the drive module 22 during operation. In the exemplary embodiment, the platform includes at least three qualified surfaces 83, 84, 85 each with an opposing clamp member. As used herein the term "qualified surface" means a surface that has been fabricated, positioned and oriented within a desired specification to allow accurate and consistent measurement or testing of a tested article. In one embodiment, the qualified surfaces 83, 84, 85 include two pins 80, 82 that extend therefrom. As will be discussed in more detail below, the pins 80, 82 and the surfaces 83, 84, 85 cooperate to hold the drive module 22 in a desired location and orientation relative to the motors 72, 74, 76 such that the pinion 40 and axles 36 are aligned within a desired specification. Adjacent the pins 80, 82 and surface 84 are clamping members, such as a rotary clamp 86 that includes an arm 88 that is movable between a released position and an engaged position. When in the engaged position, the arm 88 includes a clamping surface that contacts qualified surfaces, such as machined pads for example, on the housing 42 with sufficient force to hold the drive module 22 on the pins 80, 82 and against the surfaces 83, 84, 85 in the desired position and orientation for testing.

In one embodiment, at least one of the qualified surfaces 83, 84, 85 defines a first plane the drive module is aligned to in the engaged position. The axis of rotation for the axles 36 is generally parallel with this first plane. Further, when in the engaged position, the qualified surfaces 83, 84, 85 may align the drive module 22 with a second plane that is perpendicular to the first plane. The pinion gear 40 axis of rotation is generally parallel to or co-planar with the second plane.

Figure 4:
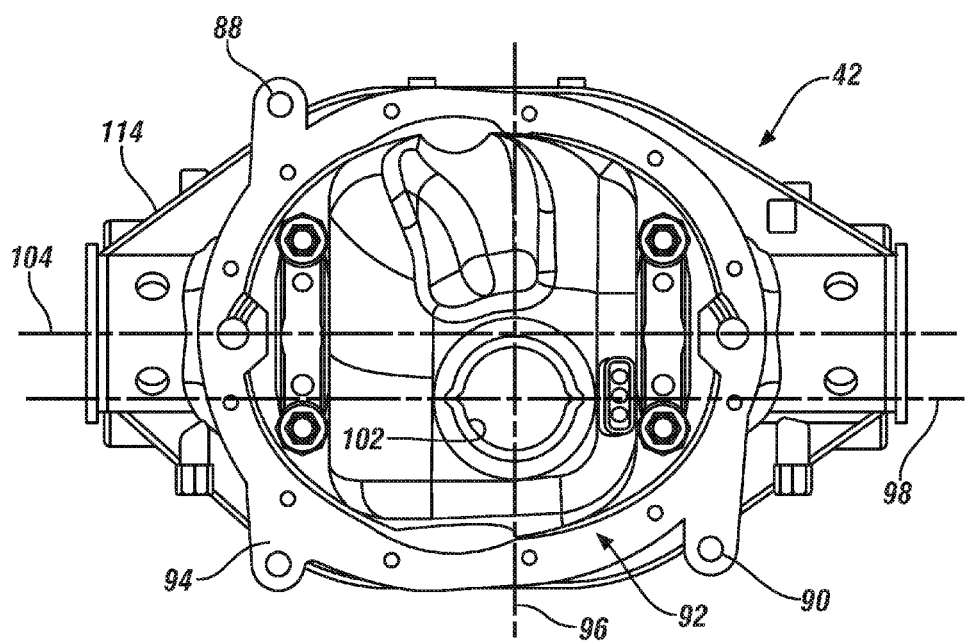
FIG. 4 is a rear view of a differential housing for use in the vehicle of FIG. 1 and the NVH test apparatus of FIG. 2 in accordance with an embodiment of the invention.
Figure 5:
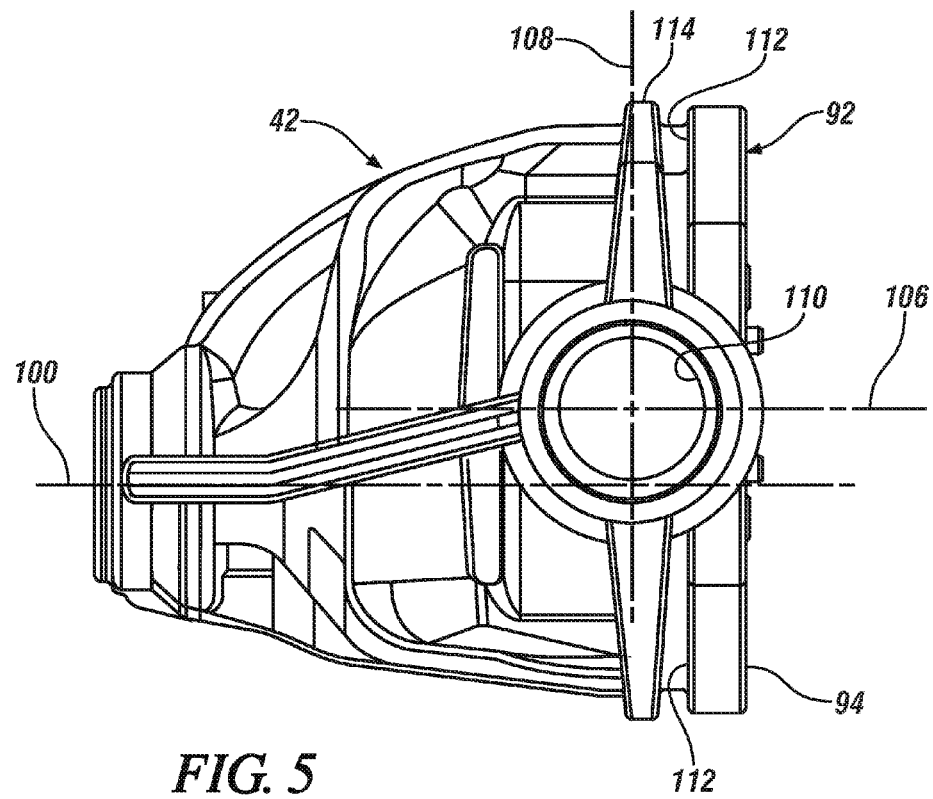
FIG. 5 is a side view of the differential housing of FIG. 4.

Referring now to FIGS. 4 and 5, an exemplary differential housing 42 is shown for use in the drive module 22 and with the NVH test apparatus 70. In this embodiment, the housing 42 includes a plurality of mounting features arranged on opposing surfaces that are configured to engage the pins 80, 82 and surfaces 83, 84, 85 when the drive module 22 is mounted on the platform 78. These mounting features include a pair of openings 88, 90 formed in a machined surface 92. The surface 92 further includes a portion 94 that is positioned to engage the surface 84 when the assembly is mounted on the platform 78. The openings 88, 90 and the portion 94 are positioned within controlled tolerances relative to the three orthogonal centerlines 96, 98, 100 of the bore 102 for the bearings that support the pinion 40 and the three orthogonal centerlines 104, 106, 108 of the axle bores 110. In one embodiment, the openings 88, 90 have a diameter of 14.3 mm+/−0.035 mm and are located with a true position 0.25 mm to the centerlines 96, 98, 104. In this embodiment, the locating surfaces 83, 84, 85 have a profile of 0.25 mm to the centerlines 96, 98, 104 and a tolerance of 0.1 mm profile of surface 83 to surfaces 84, 83 and 0.1 mm profile of surface 85 to surfaces 84, 85. Each of the surface finishes of the surface finishes is 3.2 RA.

The housing 42 further includes a plurality of surfaces or machined pads 112 arranged opposite surface 92. The surface 112 provides a surface for the arms 88 to contact when in the engaged position. It should be appreciated that while the embodiment illustrated in FIGS. 4-5 show the mounting features as being arranged on the rear surface, meaning the surface opposite the pinion 40, the claimed invention should not be so limited. In another embodiment, the mounting features may be located on a different portion of the housing 42, such as on the rib 114 for example. Further, while the illustrated embodiment shows the openings 88, 90 formed in a common surface with the portion 94, the claimed invention should not be so limited. In other embodiments, the openings 88, 90 may be formed in surfaces that are offset from both each other and the portion 94 for example.

In operation, the drive module 22 is placed on the platform 78 by placing the pins 80, 82 into the openings 88, 90 with the arms 88 in the released position. The rotary clamps 86 are actuated, moving the arms 88 into the engaged position with the arms contacting the surfaces 112 pushing the surface 92 into contact with the surfaces 83, 85 and the portion 94 into contact with the surface 84. It should be appreciated that the pins 80, 82 and openings 88, 90 align the drive module 22 in the X-Z plane relative to the motors 72, 74, 76 while the surfaces 83, 84, 85 align the drive module 22 in the Y direction. This provides advantages in the clamping of the drive module 22 onto the platform 78 in a manner that reliably and repeatably positions and aligns the pinion 40 and axles 36 with the motors 72, 74, 76 respectively within the desired tolerances to allow reliable and repeatable NVH testing.

Figure 6:
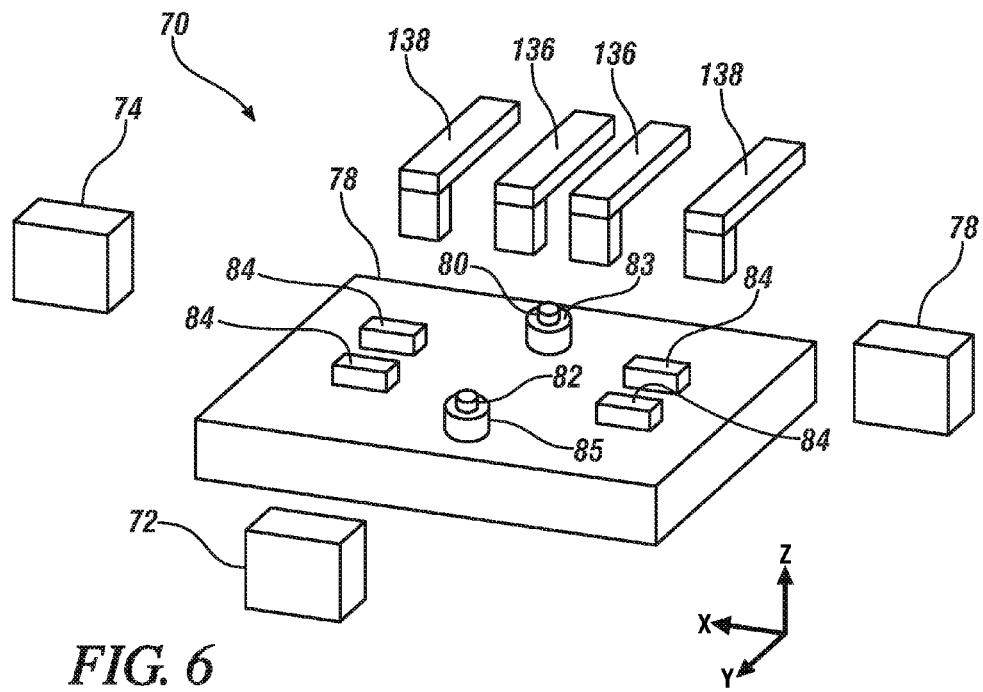
FIG. 6 is an isometric schematic view of an NVH test apparatus in accordance with another embodiment of the invention.
Figure 7:
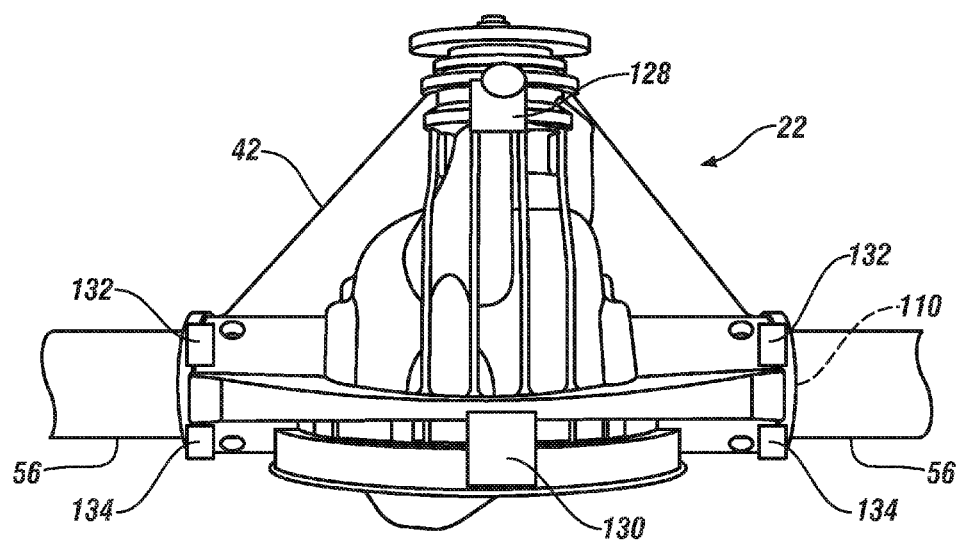
FIG. 7 is a top view of a differential housing for use in the vehicle of FIG. 1 and the NVH test apparatus of FIG. 6 in accordance with another embodiment of the invention.
Figure 8:
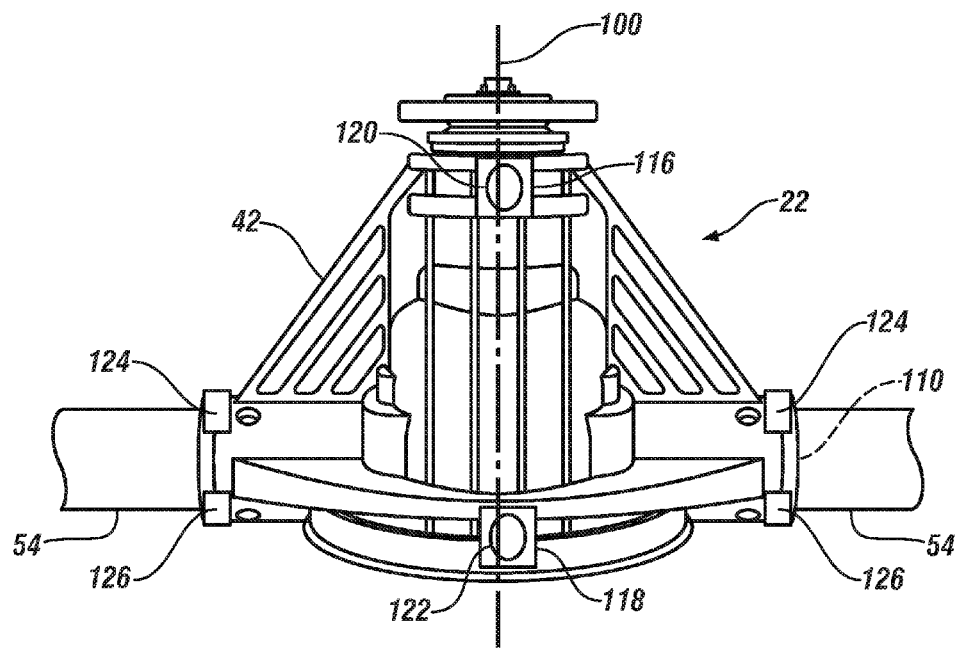
FIG. 8 is a bottom view of the differential housing and axle assembly of FIG. 7.

In the embodiment illustrated in FIGS. 4-5, the platform 78 is oriented generally vertically with the clamping pressure being generally oriented in the horizontal direction (e,g, generally parallel to the axis of the pinion 40). Referring now to FIGS. 6-8 an embodiment is illustrated of an drive module 22 that is configured to be installed on an NVH testing apparatus 70 that has clamping pressure oriented in the vertical direction (e.g. generally perpendicular to the axis of the pinion 40). In this embodiment, the platform 78 is oriented with the pins 80, 82 directed upward. The housing 42 includes two surfaces 116, 118 (FIG. 8) arranged on the bottom side (e.g. closer to the ground when oriented in the operating position). Each surface 116, 118 includes an opening hole 120, 122 sized to receive the pins 80, 82. The bottom side further includes a pair of pads or machined surfaces 124, 126 arranged on the housing 42 adjacent the bore 110 where the axle tubes 54 exit the housing 42. The pads 124, 126 are positioned to contact and be supported by the surfaces 84 on the platform 78. It should be appreciated that while the illustrated embodiment shows a pair of pads 124, 126 adjacent each axle tube 54, in other embodiments, a single pad may be used on each side.

On the top side of housing 42 (FIG. 7), a pair of machined surfaces 128, 130 are arranged opposite the surfaces 116, 118 respectively. The top side of housing 42 further includes a pair of pads or machined surfaces 132, 134 that are arranged opposite the pads 124, 126. The surfaces 128, 130 are arranged to cooperate with one or more arms 136 that apply clamping pressure thereto and hold the drive module 22 in place. The pads 132, 134 are similarly arranged to cooperate with one or more arms 138. It should be appreciated that the arms 136, 138 may be any suitable clamping device, such as a rotary clamp or a swing arm type clamp for example, that may be configured to engage the surfaces 128, 130 and pads 132, 134 to hold the assembly on the platform 78 during testing. Further it should be appreciated that the pins 80, 82 and the openings 120, 122 are arranged to align the drive module 22 relative to the motors 72, 74, 76 in the X-Y plane while the surfaces 84, 116, 118, 124, 126 align the drive module 22 in the Z direction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for performing a noise, vibration and harshness (NVH) testing on a vehicle differential housing and axle assembly, the assembly including a differential housing having a first surface with a first opening, a second surface with a second opening and a third surface, the assembly further having a pinion, a first axle and a second axle, the system comprising:
   a platform;
   a first pin extending from a first qualified surface, the first pin sized and arranged on the platform to be received in the first opening;
   a second pin extending from a second qualified surface, the second pin sized and arranged on the platform to be received in the second opening;
   a third qualified surface arranged on the platform to engage the third surface;
   a first energy source operably coupled to the platform and aligned along a first axis, the first energy source being configured to align with the pinion along the first axis;
   a second energy source coupled to the platform and aligned along a second axis, the second axis being perpendicular to the first axis, the second energy source being configured to align with the first axle along the second axis; and
   a third energy source coupled to the platform and aligned with the second axis, the third energy source being configured to align with the second axle along the second axis.

2. The system of claim 1 further comprising:
a first clamping member configured to cooperate with the first qualified surface to couple the differential housing and axle assembly to the platform;
a second clamping member configured to cooperate with the second qualified surface to couple the differential housing and axle assembly to the platform; and
a third clamping member configured to cooperate with the third qualified surface to couple the differential housing and axle assembly to the platform.

3. The system of claim 1 wherein the first pin and the second pin are oriented horizontally relative to the ground.

4. The system of claim 1 wherein the first pin and second pin are oriented vertically relative to the ground.

5. The system of claim 2 wherein:
the first clamping member includes a first clamping surface sized and positioned to engage the differential housing opposite the first qualified surface;
the second clamping member includes a second clamping surface sized and positioned to engage the differential housing opposite the second qualified surface; and
the third clamping member includes a third clamping surface sized and positioned to engage the differential housing opposite the third qualified surface.

6. A drive module configured to mount on an NVH testing apparatus, the NVH testing apparatus having a first pin, a second pin and at least one qualified surface, the assembly comprising:
a differential housing having a pinion bore and a pair of opposing axle bores, the differential housing having a first side and an opposing second side, the first side having a first surface with a first opening formed therein, a second surface with a second opening formed therein and a third surface, the second side having a first clamping surface opposite the first surface, a second clamping surface opposite the second surface and a third clamping surface opposite the third surface, wherein the first opening is sized and positioned to receive the first pin and the second opening is sized and positioned to receive the second pin;
a pinion arranged in the pinion bore and configured to couple with the NVH testing apparatus;
a first axle extending from one of the opposing axle bores; and
a second axle extending from the other of the opposing axle bores.

7. The assembly of claim 6 wherein first opening and second opening cooperate with the first pin and second pin to align the assembly relative to a plane defined by the at least one qualified surface.

8. The drive module of claim 7 wherein the first clamping surface, the second clamping surface and the third clamping surface cooperate with at least one clamping member on NVH testing apparatus to align the assembly relative to a second plane, the second plane being perpendicular to the plane.

9. The drive module of claim 8 wherein the first axle and second axle are arranged on a first axis, the first axis being parallel to first plane.

10. The drive module of claim 9 wherein the pinion rotates about a second axis, the second axis being perpendicular to the plane.

11. The drive module of claim 9 wherein the pinion rotates about a second axis, the second axis being parallel to the plane.

12. A method of NVH testing of a differential housing and axle assembly, the method comprising:
providing a test apparatus having a platform, a first pin, second pin and at least one qualified surface, the test apparatus further having a first energy source, a second energy source and a third energy source, first energy source being aligned along a first axis, the second energy source and third energy source being aligned along a second axis;
providing a drive module, the drive module including a housing having a first surface with a first opening formed therein, a second surface with a second opening formed therein and a third surface, the drive module further including a pinion arranged in the housing, a first axle and a second axle;
inserting the first pin into the first opening and the second pin into the second opening;
aligning the first axle and second axle with the second axis;
aligning the pinion with the first axis;
clamping the third surface to the at least one qualified surface; and
coupling the pinion to the first energy source, the first axle to the second energy source and the second axle to the third energy source.

13. The method of claim 12 wherein the first axle and second axle are aligned with the second axis when the third surface is clamped to the at least one qualified surface.

14. The method of claim 13 wherein the pinion is aligned with the first axis when the third surface is clamped to the at least one qualified surface.

15. The method of claim 14 wherein the at least one qualified surface includes a first qualified surface, a second qualified surface and a third qualified surface, the first qualified surface arranged directly adjacent the first pin, the second qualified surface arranged directly adjacent the second pin, the third qualified surface spaced apart from the first qualified surface and second qualified surface.

16. The method of claim 15 further comprising:
clamping the first surface with the first qualified surface;
clamping the second surface with the second qualified surface; and
clamping the third surface with the third qualified surface.

17. The method of claim 16 wherein the first surface is clamped to the first qualified surface when the third surface is clamped to the third qualified surface.

18. The method of claim 17 wherein the second surface is clamped to the second qualified surface when the third surface is clamped to the third qualified surface.

* * * * *